US009118946B2

(12) United States Patent
Kim et al.

(10) Patent No.: US 9,118,946 B2
(45) Date of Patent: Aug. 25, 2015

(54) SYSTEM, METHOD, AND APPARATUS FOR SHARING CONTENTS USING GROUPS

(75) Inventors: Ji-Hoon Kim, Seoul (KR); Youngsuk Kim, Seoul (KR); Kyong-Hyang Choi, Seoul (KR); Tae-Sook Ha, Anyang-si (KR)

(73) Assignee: KT Corporation, Seongnam (KR)

( * ) Notice: Subject to any disclaimer, the term of this patent is extended or adjusted under 35 U.S.C. 154(b) by 211 days.

(21) Appl. No.: 13/532,040

(22) Filed: Jun. 25, 2012

(65) Prior Publication Data

US 2012/0331056 A1 Dec. 27, 2012

(30) Foreign Application Priority Data

Jun. 24, 2011 (KR) .......................... 10-2011-0061894

(51) Int. Cl.
*H04N 21/254* (2011.01)
*H04N 21/258* (2011.01)
*H04N 21/2743* (2011.01)
*H04N 21/8355* (2011.01)

(52) U.S. Cl.
CPC ..... *H04N 21/2541* (2013.01); *H04N 21/25866* (2013.01); *H04N 21/2743* (2013.01); *H04N 21/8355* (2013.01)

(58) Field of Classification Search
USPC .......... 709/203, 216, 217, 229, 245; 707/608, 707/706, 708, 721, 726, 741, 749, 751, 758
See application file for complete search history.

(56) References Cited

U.S. PATENT DOCUMENTS

| 7,620,679 | B2 * | 11/2009 | Reasor et al. ................. 709/200 |
|---|---|---|---|
| 7,765,265 | B1 * | 7/2010 | Granito et al. ................ 709/206 |
| 7,783,631 | B2 * | 8/2010 | Korn et al. .................... 707/726 |
| 7,788,271 | B2 * | 8/2010 | Soma et al. .................... 707/758 |
| 8,345,917 | B2 * | 1/2013 | Sakurada ....................... 382/100 |
| 2004/0153500 | A1 * | 8/2004 | Ide et al. ....................... 709/203 |
| 2008/0249798 | A1 * | 10/2008 | Tulshibagwale ................. 705/1 |
| 2009/0106261 | A1 * | 4/2009 | Nagasaka et al. ............... 707/10 |
| 2011/0321081 | A1 * | 12/2011 | Lee et al. ......................... 725/30 |
| 2012/0066387 | A1 * | 3/2012 | Park et al. ...................... 709/225 |
| 2012/0174155 | A1 * | 7/2012 | Mowrey et al. ................. 725/40 |
| 2012/0331056 | A1 * | 12/2012 | Kim et al. ...................... 709/204 |

FOREIGN PATENT DOCUMENTS

| KR | 20060010602 A | 2/2006 |
|---|---|---|
| KR | 20080107490 A | 12/2008 |
| KR | 20100062104 A | 6/2010 |

* cited by examiner

*Primary Examiner* — Michael Y Won
(74) *Attorney, Agent, or Firm* — Sughrue Mion, PLLC

(57) ABSTRACT

A contents sharing server includes an identifier generation unit configured to assign at least one user identifier for each user, a group matching unit configured to match at least one user identifier with at least one of a plurality of groups, each of the plurality of groups having at least one contents identifier for identifying at least one content to be shared within each of the plurality of groups, a request reception unit configured to receive a request including a contents identifier and at least one user identifier, an identifier determination unit configured to search at least one group matched with the at least one user identifier, and determine whether the searched group has the contents identifier and a contents access authority assignment unit configured to assign authority for accessing contents corresponding to the contents identifier.

9 Claims, 5 Drawing Sheets

*FIG. 4*

| USER | GROUP | | |
| --- | --- | --- | --- |
| | FAMILY (AAA) | COMPANY (BBB) | SOCIETY (CCC) |
| A | a | aa | aaa |
| B | b | | bb |
| C | | c | cc |
| D | | d | |

*FIG. 5*

| CONTENTS ID | IDENTIFIER | GROUP ID |
|---|---|---|
| APP 11 | a | AAA |
| MOV 22 | b | AAA |
| MOV 33 | aaa | CCC |
| MOV 44 | cc | CCC |
| APP 22 | bb | CCC |

. . .

SYSTEM, METHOD, AND APPARATUS FOR SHARING CONTENTS USING GROUPS

CROSS-REFERENCE TO RELATED APPLICATION

This application claims priority from Korean Patent Application No. 10-2011-0061894, filed on Jun. 24, 2011 in the Korean Intellectual Property Office, the disclosure of which is incorporated herein by reference in its entirety.

BACKGROUND

1. Field

Exemplary embodiments relate to a system, apparatus, and a method for sharing contents, and more specifically, exemplary embodiments relate to a system, apparatus, and a method for sharing contents among users, by using groups.

2. Description of the Related Art

With the recent development of information communication technologies, users can use contents at any time and in any place, through various devices. A user may be provided with contents belonging to another user.

According to a related art, if multiple users share contents, purchase records and service records and so on for the shared contents are all shared. Thus, user personal information is disclosed among the users.

According to a related art, if contents purchased or retained by a user are shared with another user, there may be contents desired to be shared and contents not desired to be shared.

For example, in case of an IPTV service shared by family users, contents information purchased or used by the husband is identically released to his wife or children. Thus, contents that should not be shared (age-restricted contents or business-related contents) might be shared with the wife or the children. As a result, a user cannot be provided with his/her individual service. Further, personal information of a user may be disclosed.

SUMMARY

Accordingly, it is an aspect to provide a contents sharing scheme, in which a user enables contents to be classified into and shared by groups based on use of the contents.

Another aspect is to provide a contents sharing server for sharing contents using groups. The server includes an identifier generation unit configured to generate and assign at least one user identifier (ID), a group matching unit configured to match the at least one user identifier with at least one of a plurality of groups, each of the plurality of groups having at least one contents identifier for identifying at least one content to be shared within each of the plurality of groups, a request reception unit configured to receive a request including a contents identifier and at least one user identifier, an identifier determination unit configured to search at least one group matched with the at least one user identifier included in the request, and determine whether the searched group has the contents identifier that is included in the request and a contents access authority assignment unit configured to assign authority for accessing contents corresponding to the contents identifier included in the request, to a device if the searched group has the contents identifier that is included in the request.

The request including the contents identifier and the at least one user identifier may be received from a device. Each user may be assigned the at least one user ID.

The server may further include a user device management unit configured to manage information about at least one device that belongs to each user.

The server may further include a contents storage unit configured to match the at least one contents identifier with at least one of the at least one user identifier, and configured to store contents corresponding to the at least one contents identifier that is matched with the at least one of the at least one user identifier.

One user ID may be matched with at least two of the plurality of groups.

Another aspect is to provide a method for sharing contents using groups. The method includes generating and assigning at least one user identifier (ID) for each user, matching at least one user identifier with at least one of a plurality of groups, each of the plurality of groups having at least one contents identifier for identifying at least one kind of contents to be shared within each of the plurality of groups, receiving a request including a contents identifier and at least one user identifier from a device, searching at least one group matched with the at least one user identifier included in the request, and determining whether the searched group has the contents identifier that is included in the request, and assigning authority for accessing contents corresponding to the contents identifier included in the request, to the device if the searched group has the contents identifier that is included in the request.

The method may further include managing information about at least one device that belongs to each user. Also, the method may further include transmitting the contents corresponding to the contents identifier to the device that has received the authority for accessing the contents.

The method may further include matching each of the at least one contents identifier with at least one of the at least one user identifier, and storing contents corresponding to the at least one contents identifier that is matched with the at least one of the at least one user identifier. Also, one user ID may be matched with at least two of the plurality of groups.

Yet another aspect of an exemplary embodiment is directed to a contents sharing server for sharing contents using groups. The server includes: a group matching unit configured to match at least one user identifier (ID) with at least one of a plurality of groups, at least one of the plurality of groups having at least one contents identifier for identifying at least one content to be shared within the at least one of the plurality of groups; a request reception unit configured to receive a request including a contents identifier and at least one user identifier; an identifier determination unit configured to determine whether at least one group of the plurality of groups has the contents identifier that is included in the request; and a contents access authority assignment unit configured to assign authority for accessing contents corresponding to the contents identifier included in the request, if the at least one group has the contents identifier that is included in the request.

Each user may be assigned the at least one user ID.

The server may further include a contents storage unit configured to match the at least one contents identifier with at least one of the at least one user identifier, and configured to store contents corresponding to the at least one contents identifier matched with the at least one of the at least one user identifier.

The at least one user ID may be matched with at least two of the plurality of groups.

Yet another aspect of an exemplary embodiment is directed to a method for sharing contents using groups. The method includes: assigning at least one user identifier (ID); matching at least one user identifier with at least one of a plurality of groups, the at least one of the plurality of groups having at least one contents identifier for identifying at least one content to be shared within each of the plurality of groups; receiving a request including a contents identifier and at least one user identifier; determining whether the at least one of the plurality of groups has the contents identifier that is included in the request; and assigning authority for accessing contents corresponding to the contents identifier included in the request, to a device if the at least one of the plurality of groups has the contents identifier that is included in the request.

Each user may be assigned the at least one user ID

A user enables contents to be selectively shared by using a group, such that the contents can be classified into and shared by groups.

Since contents can be classified into and shared by groups in consideration of use of the contents, the contents are prevented from being randomly disclosed.

BRIEF DESCRIPTION OF THE DRAWINGS

Non-limiting and non-exhaustive exemplary embodiments will be described in conjunction with the accompanying drawings. Understanding that these drawings depict only several exemplary embodiments according to the disclosure and are, therefore, not intended to limit its scope, the disclosure will be described with specificity and detail through use of the accompanying drawings, in which:

FIG. 4 is an example illustrating each group matched with each user identifier in a system for contents sharing according to an exemplary embodiment;

FIG. 5 is an example illustrating an authority to access contents to be shared according to an exemplary embodiment.

DETAILED DESCRIPTION OF EXEMPLARY EMBODIMENTS

Figure 1:
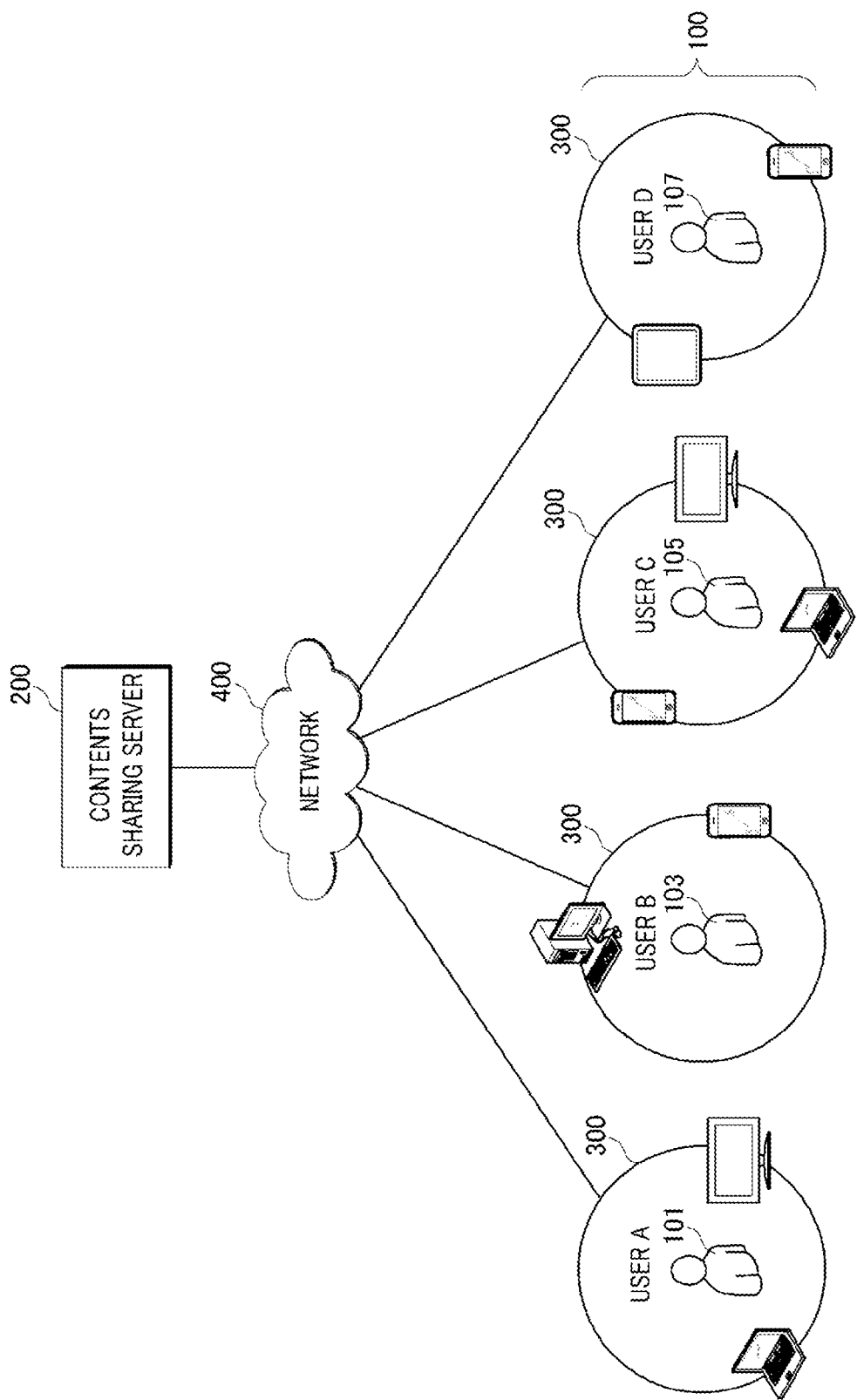
FIG. 1 is a configuration view illustrating a system for a contents sharing according to an exemplary embodiment.

Hereinafter, exemplary embodiments will be described in detail with reference to the accompanying drawings so that the exemplary embodiments may be readily implemented by those skilled in the art. However, it is to be noted that the present disclosure is not limited to the exemplary embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is configuration view illustrating a system for contents sharing according to an exemplary embodiment.

As illustrated in FIG. 1, the system for contents sharing includes at least one device 300 retained by a user 100 and a contents sharing server 200.

The user 100 retains at least one device 300 and may access the contents sharing server 200 by using at least one device 300 through a network 400. Here, the network 400 may be embodied by a wired network such as a local area network (LAN), a wide area network (WAN), or a value added network (VAN), or any type of a wireless network such as a mobile radio communication network or a satellite communication network.

Through the contents sharing server 200, the user 100 may enable contents that he/she wants to provide to be shared only with members of a group, to which the user 100 belongs.

For example, assuming that a user A 101 and a user B 103 are members of a group 'family,' a group identifier of the group 'family' may be generated as 'AAA.' A user identifier (ID) of the user A 101 may be generated as 'a'. A user identifier of the user B 103 may be generated as 'b'.

The user A 101 or B 103 that is registered as a member of the group 'AAA' may store contents to be shared with the group 'AAA' in the contents sharing server 200. The members of the group 'AAA' may be provided with the contents shared with the group 'AAA' through the contents sharing server 200. Meanwhile, a user C 105, which is not a member of the group 'AAA,' may not be provided with the contents shared with the group 'AAA.'

Figure 2:
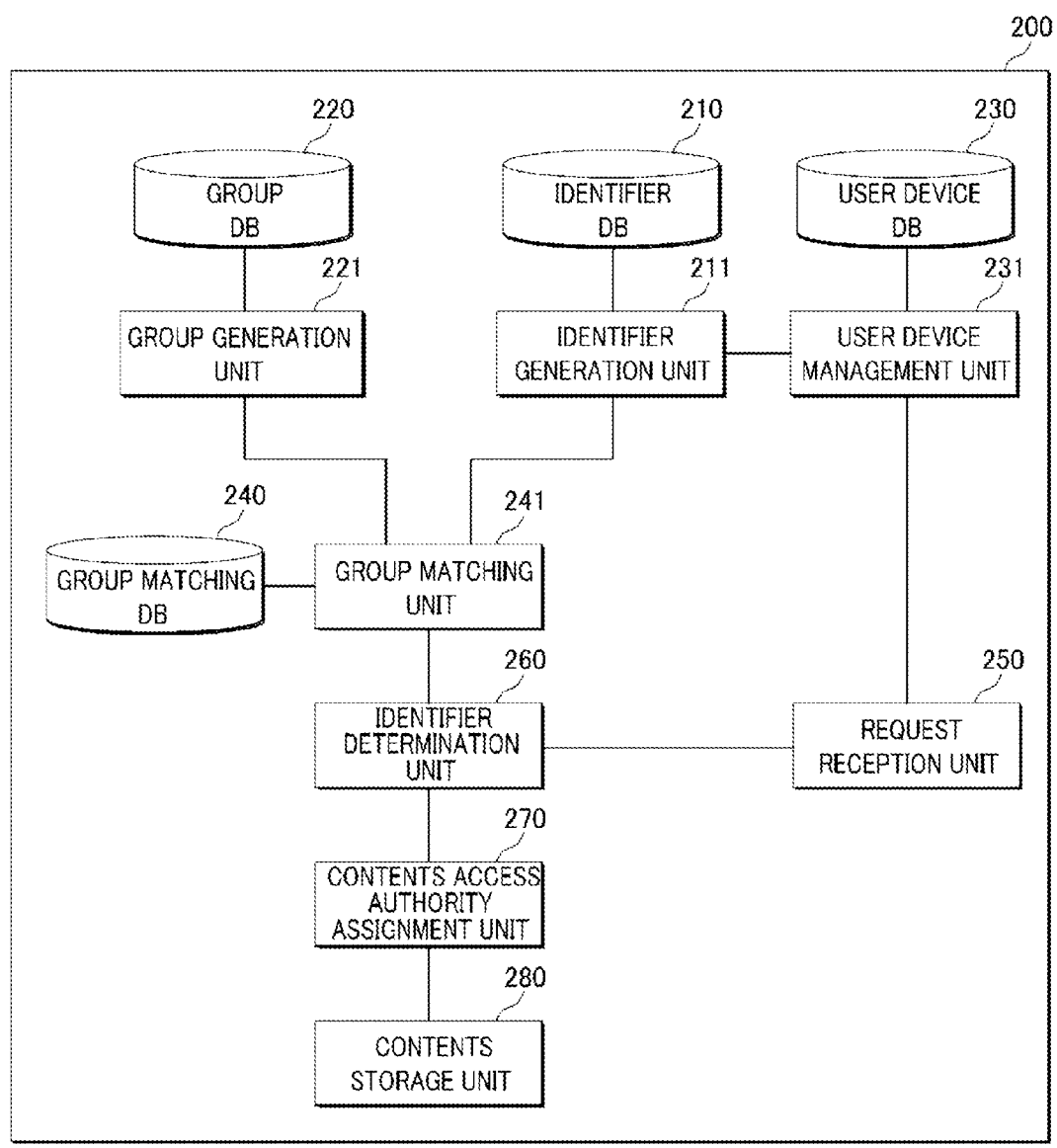
FIG. 2 is a detailed configuration view illustrating a configuration of a contents sharing server according to an exemplary embodiment.

FIG. 2 is a detailed configuration view illustrating a configuration of a contents sharing server according to an exemplary embodiment.

With reference to FIG. 2, the contents sharing server 200 according to an exemplary embodiment includes an identifier database 210, an identifier generation unit 211, a group database 220, a group generation unit 221, a user device database 230, a user device management unit 231, a group matching database 240, a group matching unit 241, a request reception unit 250, an identifier determination unit 260, a contents access authority assignment unit 270, and a contents storage unit 280.

The identifier database 210 stores a user identifier (ID) of a user therein. The identifier database 210 may store a user identifier generated by the identifier generation unit 211, which is described below.

The identifier generation unit 211 generates and assigns at least one user identifier for each user. If a user is set as a member of a group, the identifier generation unit 211 may generate a user identifier of the user and assign the user identifier to the user.

An example illustrating each user identifier for each user will be described later with reference to FIG. 3.

The group database 220 stores information about a group therein. The group database 220 may store information about a group generated by the group generation unit 221, which is described below.

In addition to generation of a group, the group generation unit 221 may generate a group identifier for the group. Also, the group generation unit 221 may generate the group when receiving a request for generation of a group from a user.

The user device database 230 stores information about at least one device belonging to each user therein. The user device database 230 may store information about the user device 300 received from the user device management unit 231, which is described below. Here, the information about the user device 300 may include a type, identification numbers, a model code, and other information related to the device.

The user device management unit 231 manages information about at least one device belonging to each user. Also, the user device management unit 231 may receive information about a device of a user from the device of the user and store the information about the device of the user in the user device database 230. The user device management unit 231 may receive necessary information from the user device database 230 and manage the information.

The user device management unit 231 may manage a user device providing contents that can be shared with a group, to which the user belongs. That is, the user device management unit 231 may classify and manage a user device capable of providing contents that can be shared by groups.

For example, when the user device management unit 231 stores and manages a notebook offered from a 'company' as a device belonging to a user, the user device management unit 231 may restrict the device to be provided only with contents that can be shared with the group 'company.' In this way, the contents sharing server 200 manages a user device as well as contents, so that disclosure of contents belonging to a user can be prevented.

The group matching database 240 stores a group matched with a user identifier. The group matching database 240 may receive a group matched with a user identifier from the group matching unit 241, which is described below, and store the group matched with the user identifier.

The group matching unit 241 may match each at least one user identifier with each group. The group matching unit 241 may match one user identifier with at least one group. A group may be matched with at least one user identifier.

For example, if a user A is a member of a group 'family' and a group 'company,' the group matching unit 241 may match a user identifier 'a' of the user A for the group 'family' with the group 'family,' and match a user identifier 'aa' of the user A for the group 'company' with the group 'company.' If a user B is a member of a group 'family,' the group matching unit 241 may match a user identifier 'b' of the user B with the group 'family.'

An example illustrating each group matched with each user identifier will be described later with reference to FIG. 4.

The contents sharing server 200 may match a group and a user identifier by using the group matching unit 241, such that the user matched with the group may be a member of the group. That is, the contents sharing server 200 may match at least one user identifier of a user with at least one group, such that the user may be set as a member of at least one group.

For example, a user A may be a member of a group 'family,' a group 'company,' and a group 'society.' A group may be matched with at least one user identifier of various users, such that the various users may be members of one group. For example, users A, C, and D may be members of a group 'company.'

The request reception unit 250 receives a request including a contents identifier and at least one user identifier from a device belonging to a user assigned the user identifier for sharing contents corresponding to the contents identifier. The request reception unit 250 may receive a request for sharing contents from a device in order to be provided with contents belonging to another device. Upon receiving the request for sharing contents, the request reception unit 250 may receive information related to the contents corresponding to the contents identifier. In this case, the information related to the contents may include information about a group set to share the contents, identification information of the contents, and other information.

The identifier determination unit 260 may search at least one group matched with the at least one user identifier included in the request, and determine whether the searched group has the contents identifier included in the request.

That is, the identifier determination unit 260 may determine whether a user identifier corresponding to a device making a request for sharing contents via the request reception unit 250 is matched with a group sharing the contents requested to be shared. The identifier determination unit 260 may determine whether a user having a device making a request for sharing contents is a member of a group sharing the contents.

Also, the identifier determination unit 260 may provide the results of the determination to the contents access authority assignment unit 270, which is described below.

If the searched group has the contents identifier included in the request, the contents access authority assignment unit 270 may assign authority for accessing the contents corresponding to the contents identifier included in the request to the device.

An example illustrating an authority to access contents to be shared will be described later with reference to FIG. 5.

Accordingly, when a device requests contents, the contents sharing server 200 determines whether a group corresponding to a user identifier included in the request has the contents identifier included in the request. If a searched group has the contents identifier included in the request, the contents sharing server 200 may provide the contents requested to be shared.

The contents storage unit 280 stores contents belonging to a device therein. The contents storage unit 280 may store contents allowed to be shared. The contents storage unit 280 may match each at least one contents identifier with each at least one user identifier, and may store contents corresponding to the contents identifier matched with the user identifier.

Figure 3:
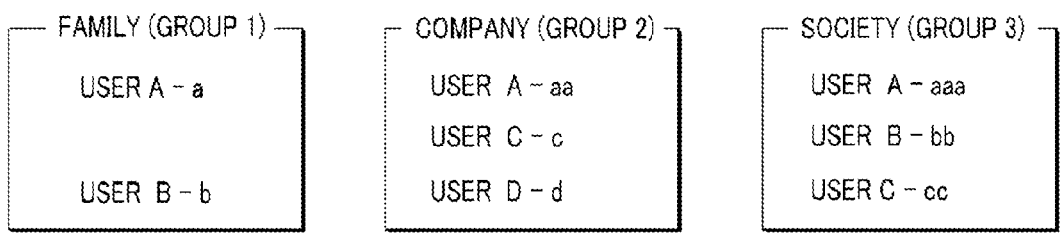
FIG. 3 is an example illustrating each user identifier for each user according to an exemplary embodiment.

FIG. 3 is an example illustrating each user identifier for each user according to an exemplary embodiment.

As illustrated in FIG. 3, at least one user identifier for a user may be generated. A user identifier may be generated by groups.

For example, if groups are generated as a family (group 1), a company (group 2), and a society (group 3), a user identifier of a user may be generated by the groups.

If a user A is a member of the family (group 1), a user identifier for the family (group 1) of the user A may be generated as 'a.' If a user B is a member of the family (group 1), a user identifier for the family (group 1) of the user B may be generated as 'b.'

If the user A is a member of the company (group 2), a user identifier for the company (group 2) of the user A may be generated as 'aa.' If a user C is a member of the company (group 2), a user identifier for the company (group 2) of the user C may be generated as 'c.' If a user D is a member of the company (group 2), a user identifier for the company (group 2) of the user D may be generated as 'd.'

If the user A is a member of the society (group 3), a user identifier for the society (group 2) of the user A may be generated as 'aaa.' If the user B is a member of the society (group 3), a user identifier for the society (group 3) of the user B may be generated as 'bb.' If the user C is a member of the society (group 3), a user identifier for the society (group 3) of the user C may be generated as 'cc.'

FIG. 4 is an example illustrating each group matched with each user identifier in a system for contents sharing according to an exemplary embodiment.

As illustrated in FIG. 4, the contents sharing server may match each group and each user identifier with each other. Here, a group identifier of the family (group 1) may be generated as "AAA." A group identifier of the company (group 2) may be generated as "BBB." A group identifier of the society (group 3) may be generated as "CCC."

For example, 'a,' which is the user identifier for the family (group 1) of the user A, may be matched with 'AAA,' which is the group identifier of the family (group 1). Also, 'aa,' which is the user identifier for the company (group 2), may be matched with 'BBB,' which is the group identifier of the company (group 2). Further, 'aaa,' which is the user identifier for the society (group 3) of the user A, may be matched with 'CCC,' which is the group identifier of the society (group 3). Here, one user identifier of the user A may be matched with at least one group.

The user B may be matched with 'b,' which is the user identifier for the family (group 1), and 'AAA,' which is the identifier of the family (group 1). The user B may be matched with 'bb,' which is the user identifier of the society (group 3), and 'CCC,' which is the identifier of the society (group 3).

FIG. 5 is an example illustrating an authority to access contents to be shared according to an exemplary embodiment.

As illustrated in FIG. 5, the contents sharing server may store contents identifier, a user identifier of a user possessing a device retaining contents corresponding to the contents identifier, and a group identifier of a group that may share the contents, to manage an authority to access the contents.

That is, the contents sharing server may manage an authority to access contents to be shared by groups. An authority to access contents may be assigned to at least one group by a user retaining the contents. The present disclosure is not limited to the case where singular content is shared with one group. Content may be shared with at least one group. A user retaining contents may assign an authority to access the contents according to groups.

A contents identifier is information related to identifying contents.

For example, contents with a contents identifier of 'APP11' may be stored while being matched with 'a,' which is the user identifier for the family (group 1) of the user A, and "AAA," which is the group identifier for the group 1. Thereafter, when a request for sharing the contents 'APP11' is received from another device belonging to a user included in the group 'AAA,' the contents sharing system may provide the requested contents 'APP11' to the other device.

Figure 6:
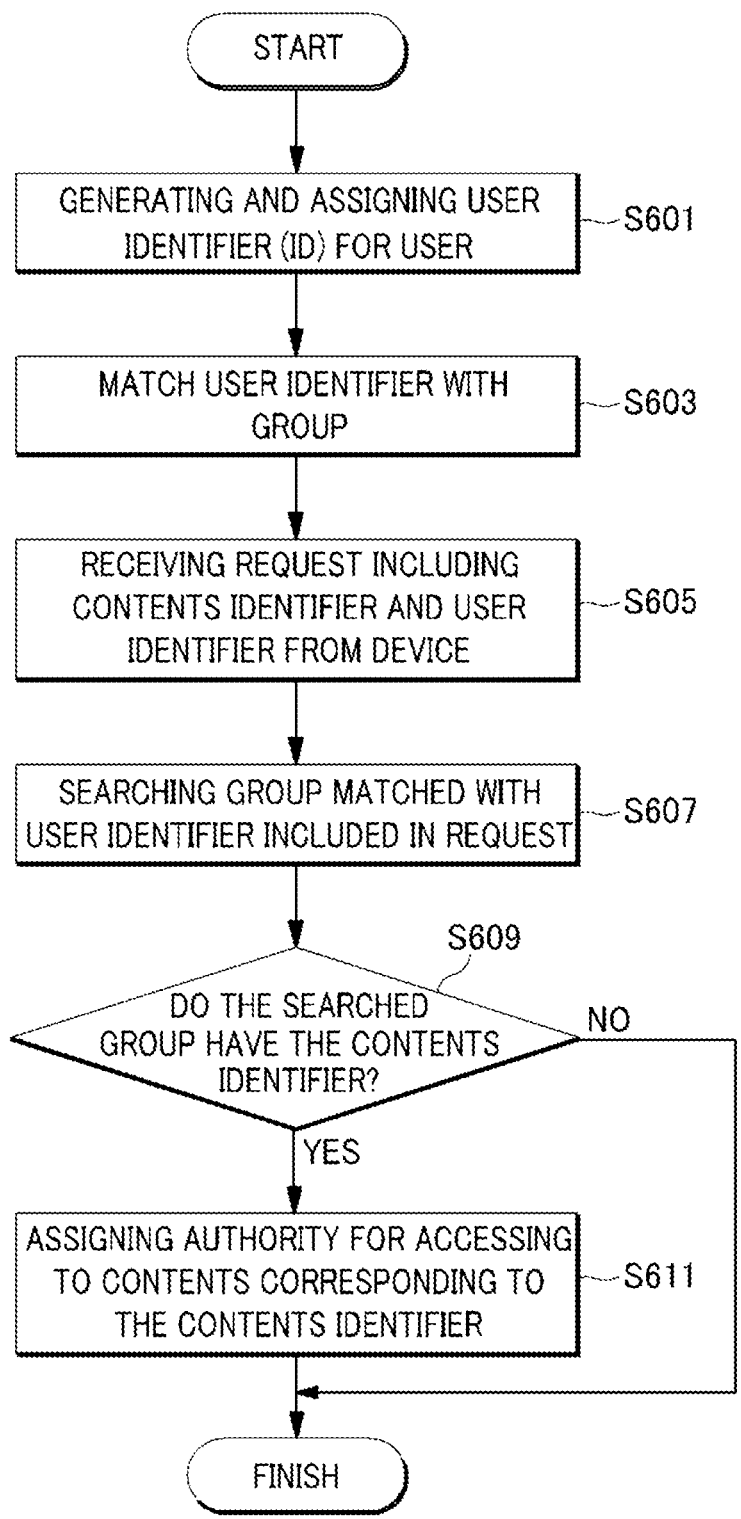
FIG. 6 is a flow chart illustrating a method for providing contents in a system for contents sharing according to an exemplary embodiment.

FIG. 6 is a flow chart illustrating a method for providing contents in a system for according to an exemplary embodiment.

With reference to FIG. 6, in operation S601, the contents sharing server 200 generates and assigns a user identifier (ID) for a user by receiving a generation request from a device belonging to the user.

In operation S603, the contents sharing server 200 may match a user identifier with a group. A group may be matched with a multiple of user identifiers.

In operation S605, the contents sharing server 200 may receive a request including a contents identifier and a user identifier from a device.

In operation S607, the contents sharing server 200 may search a group matched with the user identifier included in the request received in operation S605.

In operation S609, the contents sharing server 200 determines whether the searched group have the contents identifier included in the request received in operation S605.

As a result of the determination, in operation S611, the contents sharing server 200 may assign authority for accessing to contents corresponding to the contents identifier included in the request to the device if the searched group has the contents identifier included in the request.

In this way, the contents sharing server 200 determines whether a user is a member of a group by using a group identifier of the user, such that contents can be shared and provided by groups.

The exemplary embodiments may be embodied in a transitory or non-transitory storage medium which includes instruction codes which are executable by a computer or processor, such as a program module which is executable by the computer or processor. A data structure according to the exemplary embodiments may be stored in the storage medium and executable by the computer or processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of the exemplary embodiments is provided for the purpose of illustration, and it will be understood by those skilled in the art that various changes and modifications may be made without changing a technical conception and/or any essential features of the exemplary embodiments. Thus, the above-described exemplary embodiments are illustrative in all aspects, and do not limit the present disclosure. For example, each component described to be of a single type can be implemented in a distributed manner. Likewise, components described to be distributed can be implemented in a combined manner.

The scope of the present inventive concept is defined by the claims and their equivalents rather than by the detailed description of the exemplary embodiments. It shall be understood that all modifications and exemplary embodiments conceived from the meaning and scope of the claims and their equivalents are included in the scope of the present inventive concept.

What is claimed is:

1. A contents sharing server for sharing contents using groups, the server comprising:
    an identifier generation unit configured to generate and assign at least one user identifier (ID) to a user;
    a group matching unit configured to match the at least one user identifier with at least one of a plurality of groups, each of the plurality of groups having at least one contents identifier for identifying at least one content to be shared within each of the plurality of groups;
    a request reception unit configured to receive a request including a contents identifier and at least one user identifier;
    an identifier determination unit configured to search at least one group matched with the at least one user identifier included in the request, and determine whether the searched group has the contents identifier that is included in the request;

a contents access authority assignment unit configured to assign authority for accessing contents corresponding to the contents identifier included in the request, to a device if the searched group has the contents identifier that is included in the request; and a contents storage unit configured to match the at least one contents identifier with at least one of the at least one user identifier, and configured to store contents corresponding to the at least one contents identifier that is matched with the at least one of the at least one user identifier, wherein the generation of the at least one user ID is performed at the contents sharing server, and wherein the user belongs to at least two of the plurality of groups, wherein the user has a separate user ID for each of the at least two of the plurality of groups, and wherein the at least one content comprises at least one from among video and images.

2. The server of claim 1, wherein the request including the contents identifier and the at least one user identifier is received from the device.

3. The server of claim 1, wherein each user is assigned the at least one user ID.

4. The server of claim 1, further comprising:
a user device management unit configured to manage information about at least one device that belongs to each user.

5. The server of claim 1, wherein one user identifier is matched with at least two of the plurality of groups.

6. A method for sharing contents using groups, the method comprising:
at a contents sharing server, generating and assigning at least one user identifier (ID) for each user;

matching at least one user identifier with at least one of a plurality of groups, each of the plurality of groups having at least one contents identifier for identifying at least one content to be shared within each of the plurality of groups;

receiving a request including a contents identifier and at least one user identifier from a device;

searching at least one group matched with the at least one user identifier included in the request, and determining whether the searched group has the contents identifier that is included in the request;

assigning authority for accessing contents corresponding to the contents identifier included in the request, to the device if the searched group has the contents identifier that is included in the request; and at a contents storage unit, matching each of the at least one contents identifier with at least one of the at least one user identifier, and storing contents corresponding to the at least one contents identifier that is matched with the at least one of the at least one user identifier, and wherein the user belongs to at least two of the plurality of groups, wherein the user has a separate user ID for each of the at least two of the plurality of groups, and wherein the at least one content comprises at least one from among video and images.

7. The method of claim 6, further comprising:
managing information about at least one device that belongs to each user.

8. The method of claim 7, further comprising:
transmitting the contents corresponding to the contents identifier to the device that has received the authority for accessing the contents.

9. The method of claim 6, wherein one user identifier is matched with at least two of the plurality of groups.

* * * * *